(12) United States Patent
Ito et al.

(10) Patent No.: US 7,474,881 B2
(45) Date of Patent: Jan. 6, 2009

(54) DEMODULATING DEVICE

(75) Inventors: Osamu Ito, Tokyo (JP); Toshiaki Iimura, Kanagawa (JP); Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 567 days.

(21) Appl. No.: 11/132,655

(22) Filed: May 19, 2005

(65) Prior Publication Data

US 2005/0260968 A1 Nov. 24, 2005

(30) Foreign Application Priority Data

May 21, 2004 (JP) ............................. 2004-151492

(51) Int. Cl.
*H04B 7/08* (2006.01)

(52) U.S. Cl. ...................... 455/132; 455/293; 455/134; 455/141; 455/168.1

(58) Field of Classification Search ................ 455/132, 455/293, 134, 141, 168.1
See application file for complete search history.

(56) References Cited

U.S. PATENT DOCUMENTS

| | | | | |
|---|---|---|---|---|
| 6,959,175 | B2* | 10/2005 | Ohtaki | ........................ 455/139 |
| 7,058,379 | B2* | 6/2006 | Draijer | ........................ 455/258 |
| 2004/0190658 | A1* | 9/2004 | Ohtaki et al. | ................ 375/347 |

FOREIGN PATENT DOCUMENTS

| JP | 03-255732 A | 11/1991 |
|---|---|---|
| JP | 03-255734 A | 11/1991 |
| JP | 09-307490 A | 11/1997 |
| JP | 10-303795 A | 11/1998 |
| JP | 10-336159 A | 12/1998 |
| JP | 2000-041020 A | 2/2000 |
| JP | 2000-201130 A | 7/2000 |
| JP | 2000-261405 A | 9/2000 |
| JP | 2003-204317 A | 7/2003 |
| JP | 2003-218756 A | 7/2003 |
| JP | 2004-356698 A | 12/2004 |

* cited by examiner

*Primary Examiner*—Sanh D Phu
(74) *Attorney, Agent, or Firm*—Lerner, David, Littenberg, Krumholz & Mentlik, LLP

(57) ABSTRACT

Disclosed herein is a demodulating device including, first high-frequency receiving means and second high-frequency receiving means for receiving a high-frequency signal of one of a first frequency and a second frequency, first signal strength detecting means and second signal strength detecting means for detecting strengths of signals received by the first high-frequency receiving means and the second high-frequency receiving means, respectively, and strength determining means for performing control so as to make the second high-frequency receiving means receive a high-frequency signal of the first frequency when the first high-frequency receiving means is made to receive the high-frequency signal of the first frequency and the second high-frequency receiving means is made to receive a high-frequency signal of the second frequency and when the second signal strength detecting means does not detect a predetermined signal strength within a predetermined time after the first signal strength detecting means detects a predetermined signal strength.

12 Claims, 10 Drawing Sheets

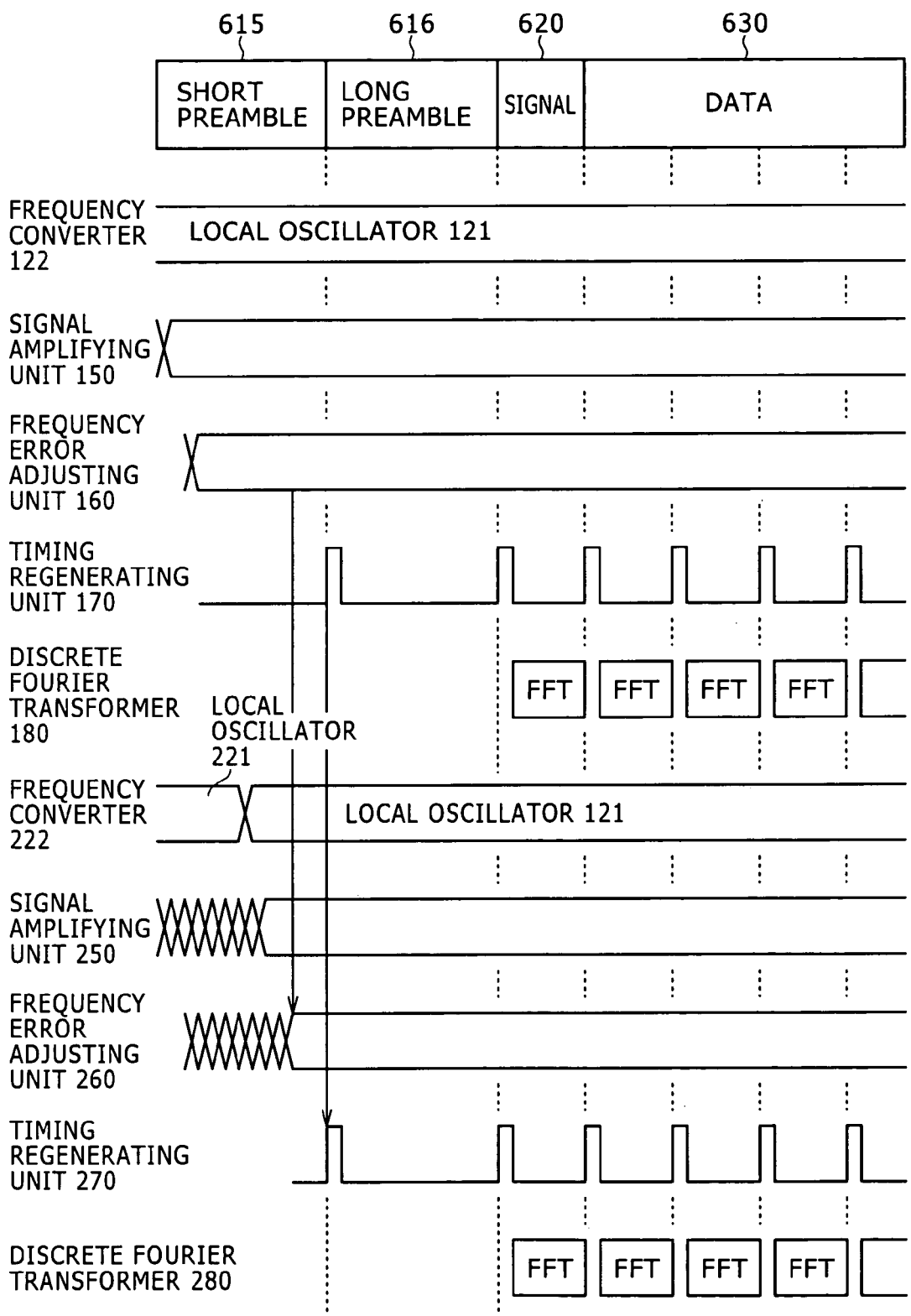

DEMODULATING DEVICE

BACKGROUND OF THE INVENTION

The present invention relates to a demodulating device, and particularly to a demodulating device for simultaneously demodulating a plurality of carriers, a process method of the demodulating device, and a program for making a computer carry out the method.

Demodulating devices have been reduced in circuit size due to progress of semiconductor technology, and demodulating devices that singly demodulate a plurality of carriers simultaneously have been in use. In a frequency diversity system, for example, a transmitting side transmits an identical signal by a plurality of different carriers, and a receiving side selects or synthesizes the carriers, thereby improving characteristics. This frequency diversity system has an advantage in that since an identical signal is transmitted by a plurality of carriers, even when some of the carriers cannot be received, reception is made possible by other carriers. An OFDM (Orthogonal Frequency Division Multiplexing) system, in particular, has many carries, and it is therefore very unlikely that none of the carries can be received. In addition, the OFDM system allows flexible selection of a combination of carriers for transmitting an identical signal. For these reasons, the OFDM system is widely used (see for example Patent Document 1 and Patent Document 2).

Such a demodulating device is configured such that different receiving blocks are provided so as to correspond to respective carries and the receiving blocks receive the respective corresponding carriers.

[Patent Document 1]
Japanese Patent Laid-open No. 2000-201130 (FIG. 5)
[Patent Document 2]
Japanese Patent Laid-open No. Hei 10-336159 (FIG. 1)

SUMMARY OF THE INVENTION

As described above, a demodulating device that demodulates a plurality of carriers have a plurality of receiving blocks corresponding to respective carriers. However, when carries corresponding to these receiving blocks cannot be received due to deterioration of a communication state, for example, the receiving blocks do not perform a demodulation process. That is, although the demodulating device has the plurality of receiving blocks, there are receiving blocks not used at all, which can be said to be inefficient from a viewpoint of efficiency of use of hardware resources.

Accordingly, the present invention has been made in view of such a situation, and it is desirable to make effective use of receiving blocks in a demodulating device.

According to a first embodiment of the present invention, there is provided a demodulating device including, first high-frequency receiving means and second high-frequency receiving means for receiving a high-frequency signal of one of a first frequency and a second frequency, first signal strength detecting means and second signal strength detecting means for detecting strengths of signals received by the first high-frequency receiving means and the second high-frequency receiving means, respectively, and strength determining means for performing control so as to make the second high-frequency receiving means receive a high-frequency signal of the first frequency when the first high-frequency receiving means is made to receive the high-frequency signal of the first frequency and the second high-frequency receiving means is made to receive a high-frequency signal of the second frequency and when the second signal strength detecting means does not detect a predetermined signal strength within a predetermined time after the first signal strength detecting means detects a predetermined signal strength. Thereby an effect is produced in that efficiency of use of receiving blocks is increased by space diversity by stopping reception at the frequency at which the predetermined signal strength is not detected.

According to a second embodiment of the present invention, the demodulating device according to the first embodiment of the present invention further includes, first frequency error adjusting means and second frequency error adjusting means for generating and adjusting carrier frequency errors of the signals received by the first high-frequency receiving means and the second high-frequency receiving means, and frequency error adjustment control means for supplying the carrier frequency error generated by the first frequency error adjusting means to the second frequency error adjusting means when the second signal strength detecting means does not detect the predetermined signal strength within the predetermined time after the first signal strength detecting means detects the predetermined signal strength. Thereby an effect is produced in that the second frequency error adjusting means is made to perform frequency error adjustment using the carrier frequency error generated by the first frequency error adjusting means.

According to a third embodiment of the present invention, the demodulating device according to the second embodiment of the present invention further includes: first timing regenerating means and second timing regenerating means for regenerating timing of a demodulation process for respective output signals of the first frequency error adjusting means and the second frequency error adjusting means, and timing regeneration control means for supplying the timing regenerated by the first timing regenerating means to the second timing regenerating means when the second signal strength detecting means does not detect the predetermined signal strength within the predetermined time after the first signal strength detecting means detects the predetermined signal strength. Thereby an effect is produced in that the second timing regenerating means is made to perform timing regeneration using the timing regenerated by the first timing regenerating means.

According to a fourth embodiment of the present invention, the demodulating device according to the first embodiment of the present invention further includes, first timing regenerating means and second timing regenerating means for regenerating timing of a demodulation process for the signals received by the first high-frequency receiving means and the second high-frequency receiving means, and timing regeneration control means for supplying the timing regenerated by the first timing regenerating means to the second timing regenerating means when the second signal strength detecting means does not detect the predetermined signal strength within the predetermined time after the first signal strength detecting means detects the predetermined signal strength. Thereby an effect is produced in that the second timing regenerating means is made to perform timing regeneration using the timing regenerated by the first timing regenerating means.

According to a fifth embodiment of the present invention, there is provided a demodulating device including, first high-frequency receiving means and second high-frequency receiving means for receiving a high-frequency signal of one of a first frequency and a second frequency, first signal strength detecting means and second signal strength detecting means for detecting strengths of signals received by the first high-frequency receiving means and the second high-frequency receiving means, respectively, strength determining means for performing control so as to make the second high-frequency receiving means receive a high-frequency signal of the first frequency when the first high-frequency receiving means is made to receive the high-frequency signal of the first frequency and the second high-frequency receiving means is made to receive a high-frequency signal of the second frequency and when the second signal strength detecting means does not detect a predetermined signal strength within a predetermined time after the first signal strength detecting means detects a predetermined signal strength, first frequency error adjusting means and second frequency error adjusting means for generating and adjusting carrier frequency errors of the signals received by the first high-frequency receiving means and the second high-frequency receiving means, respectively, frequency error adjustment control means for supplying the carrier frequency error generated by the first frequency error adjusting means to the second frequency error adjusting means when the second signal strength detecting means does not detect the predetermined signal strength within the predetermined time after the first signal strength detecting means detects the predetermined signal strength, first demodulating means and second demodulating means for demodulating respective output signals of the first frequency error adjusting means and the second frequency error adjusting means, first timing regenerating means and second timing regenerating means for regenerating timing of a demodulation process by the first demodulating means and the second demodulating means for the respective output signals of the first frequency error adjusting means and the second frequency error adjusting means, timing regeneration control means for supplying the timing regenerated by the first timing regenerating means to the second timing regenerating means when the second signal strength detecting means does not detect the predetermined signal strength within the predetermined time after the first signal strength detecting means detects the predetermined signal strength, and signal processing means for performing signal processing on output signals of the first demodulating means and the second demodulating means. Thereby an effect is produced in that efficiency of use of receiving blocks is increased by space diversity by stopping reception at the frequency at which the predetermined signal strength is not detected.

According to a sixth embodiment of the present invention, in the demodulating device according to the fifth embodiment of the present invention, the signal processing means includes error detecting means for detecting errors in the respective output signals of the first demodulating means and the second demodulating means, and selecting means for selecting an output signal whose error is not detected by the error detecting means from the output signals of the first demodulating means and the second demodulating means. Thereby an effect is produced in that an output signal whose error is not detected by the error detecting means is selected from the output signals of the first demodulating means and the second demodulating means.

According to a seventh embodiment of the present invention, in the demodulating device according to the fifth embodiment of the present invention, the signal processing means includes selecting means for selecting an output signal having a higher strength of the strengths detected by the first signal strength detecting means and the second signal strength detecting means from the output signals of the first demodulating means and the second demodulating means. Thereby an effect is produced in that a stable signal is selected on the basis of signal strength.

According to an eighth embodiment of the present invention, in the demodulating device according to the fifth embodiment of the present invention, the signal processing means includes synthesizing means for synthesizing the output signals of the first demodulating means and the second demodulating means in subcarrier units. Thereby an effect is produced in that a stable signal is synthesized in subcarrier units.

According to a ninth embodiment of the present invention, there is provided a demodulating method for a demodulating device, the demodulating device including first high-frequency receiving means and second high-frequency receiving means for receiving a high-frequency signal of one of a first frequency and a second frequency, first frequency error adjusting means and second frequency error adjusting means for generating and adjusting carrier frequency errors of the signals received by the first high-frequency receiving means and the second high-frequency receiving means, respectively, and first timing regenerating means and second timing regenerating means for regenerating timing of a demodulation process for respective output signals of the first frequency error adjusting means and the second frequency error adjusting means, the demodulating method including the steps of, making the first high-frequency receiving means receive a high-frequency signal of the first frequency and making the second high-frequency receiving means receive a high-frequency signal of the second frequency, detecting strengths of the signals received by the first high-frequency receiving means and the second high-frequency receiving means, respectively, performing control so as to make the second high-frequency receiving means receive the high-frequency signal of the first frequency when a predetermined signal strength is not detected from the second high-frequency receiving means within a predetermined time after a predetermined signal strength is detected from the first high-frequency receiving means, a step of supplying the carrier frequency error generated by the first frequency error adjusting means to the second frequency error adjusting means when the predetermined signal strength is not detected from the second high-frequency receiving means within the predetermined time after the predetermined signal strength is detected from the first high-frequency receiving means, and a step of supplying the timing regenerated by the first timing regenerating means to the second timing regenerating means when the predetermined signal strength is not detected from the second high-frequency receiving means within the predetermined time after the predetermined signal strength is detected from the first high-frequency receiving means. Thereby an effect is produced in that efficiency of use of receiving blocks is increased by space diversity by stopping reception at the frequency at which the predetermined signal strength is not detected.

According to a tenth embodiment of the present invention, there is provided a program for a demodulating device, the demodulating device including first high-frequency receiving means and second high-frequency receiving means for receiving a high-frequency signal of one of a first frequency and a second frequency, first frequency error adjusting means and second frequency error adjusting means for generating and adjusting carrier frequency errors of the signals received by the first high-frequency receiving means and the second high-frequency receiving means, respectively, and first timing regenerating means and second timing regenerating means for regenerating timing of a demodulation process for respective output signals of the first frequency error adjusting means and the second frequency error adjusting means, the program making a computer perform with the steps of making the first high-frequency receiving means receive a high-frequency signal of the first frequency and making the second high-frequency receiving means receive a high-frequency signal of the second frequency, detecting strengths of the signals received by the first high-frequency receiving means and the second high-frequency receiving means, respectively, performing control so as to make the second high-frequency receiving means receive the high-frequency signal of the first frequency when a predetermined signal strength is not detected from the second high-frequency receiving means within a predetermined time after a predetermined signal strength is detected from the first high-frequency receiving means, supplying the carrier frequency error generated by the first frequency error adjusting means to the second frequency error adjusting means when the predetermined signal strength is not detected from the second high-frequency receiving means within the predetermined time after the predetermined signal strength is detected from the first high-frequency receiving means, and supplying the timing regenerated by the first timing regenerating means to the second timing regenerating means when the predetermined signal strength is not detected from the second high-frequency receiving means within the predetermined time after the predetermined signal strength is detected from the first high-frequency receiving means. Thereby an effect is produced in that efficiency of use of receiving blocks is increased by space diversity by stopping reception at the frequency at which the predetermined signal strength is not detected.

The present invention produces an excellent effect of making effective use of a plurality of receiving blocks provided in a demodulating device.

BRIEF DESCRIPTION OF THE DRAWINGS

FIG. 7 is a diagram showing an example of operation timing in the embodiment of the present invention;

DETAILED DESCRIPTION OF THE PREFERRED EMBODIMENTS

A preferred embodiment of the present invention will next be described in detail with reference to the drawings.

Figure 1:
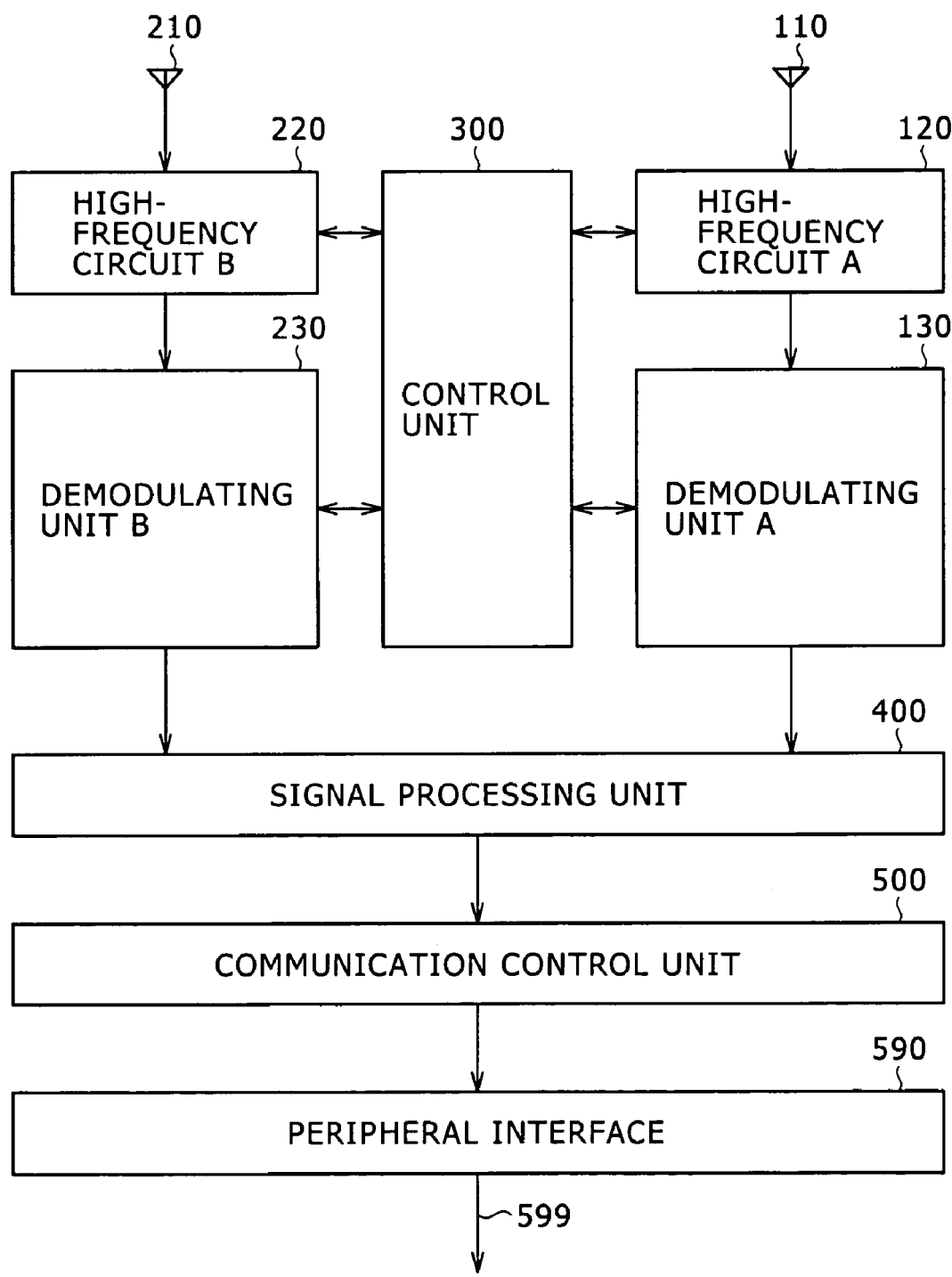
FIG. 1 is a diagram showing an example of configuration of a demodulating device according to an embodiment of the present invention.

FIG. 1 is a diagram showing an example of configuration of a demodulating device according to an embodiment of the present invention. This demodulating device includes antennas A 110 and B 210, high-frequency circuits A 120 and B 220, demodulating units A 130 and B 230, a control unit 300, a signal processing unit 400, a communication control unit 500, and a peripheral interface 590. That is, the demodulating device has two systems as receiving blocks, one system including the antenna A 110, the high-frequency circuit A 120, and the demodulating unit A 130, and the other system including the antenna B 210, the high-frequency circuit B 220, and the demodulating unit B 230. Incidentally, while the demodulating device having the receiving blocks of the two systems is taken as an example in this case for convenience of description, the present invention is not limited to this, and is similarly applicable to demodulating devices having receiving blocks of three systems and more.

The antennas A 110 and B 210 are used to receive respective separate signals. For example, the antennas A 110 and B 210 may receive high-frequency signals in a 2.4 GHz band and a 5.2 GHz band, respectively, or may receive high-frequency signals based on different carriers in the same frequency band. The high-frequency circuits A 120 and B 220 are connected to the antennas A 110 and B 210, respectively. The high-frequency circuits A 120 and B 220 have a role of converting the high-frequency signals from the antennas A 110 and B 210 into intermediate-frequency signals. The frequency conversion by the high-frequency circuits A 120 and B 220 is controlled by the control unit 300.

The demodulating units A 130 and B 230 are connected to the high-frequency circuits A 120 and B 220, respectively. The demodulating units A 130 and B 230 have a role of demodulating the intermediate-frequency signals from the high-frequency circuits A 120 and B 220. The demodulation process by the demodulating units A 130 and B 230 is controlled by the control unit 300.

The signal processing unit 400 is connected to the demodulating units A 130 and B 230. The signal processing unit 400 has a role of for example synthesizing the signals of the two systems from the demodulating units A 130 and B 230. The communication control unit 500 is connected to the signal processing unit 400. The communication control unit 500 performs processing mainly in a logical layer on a signal supplied from the signal processing unit 400. The processing in the logical layer includes for example processing of frames in a MAC (Media Access Control) sublayer in a data link layer.

The peripheral interface 590 is an interface for connecting the receiving device. When the receiving device is a terminal station, a host interface is used as the peripheral interface 590, and a port 599 of the host interface is connected with a host apparatus such as a computer or the like. On the other hand, when the receiving device is a base station, a network interface is used as the peripheral interface 590, and a port 599 of the network interface is connected with a modem or the like to use the Internet or the like.

Figure 2:
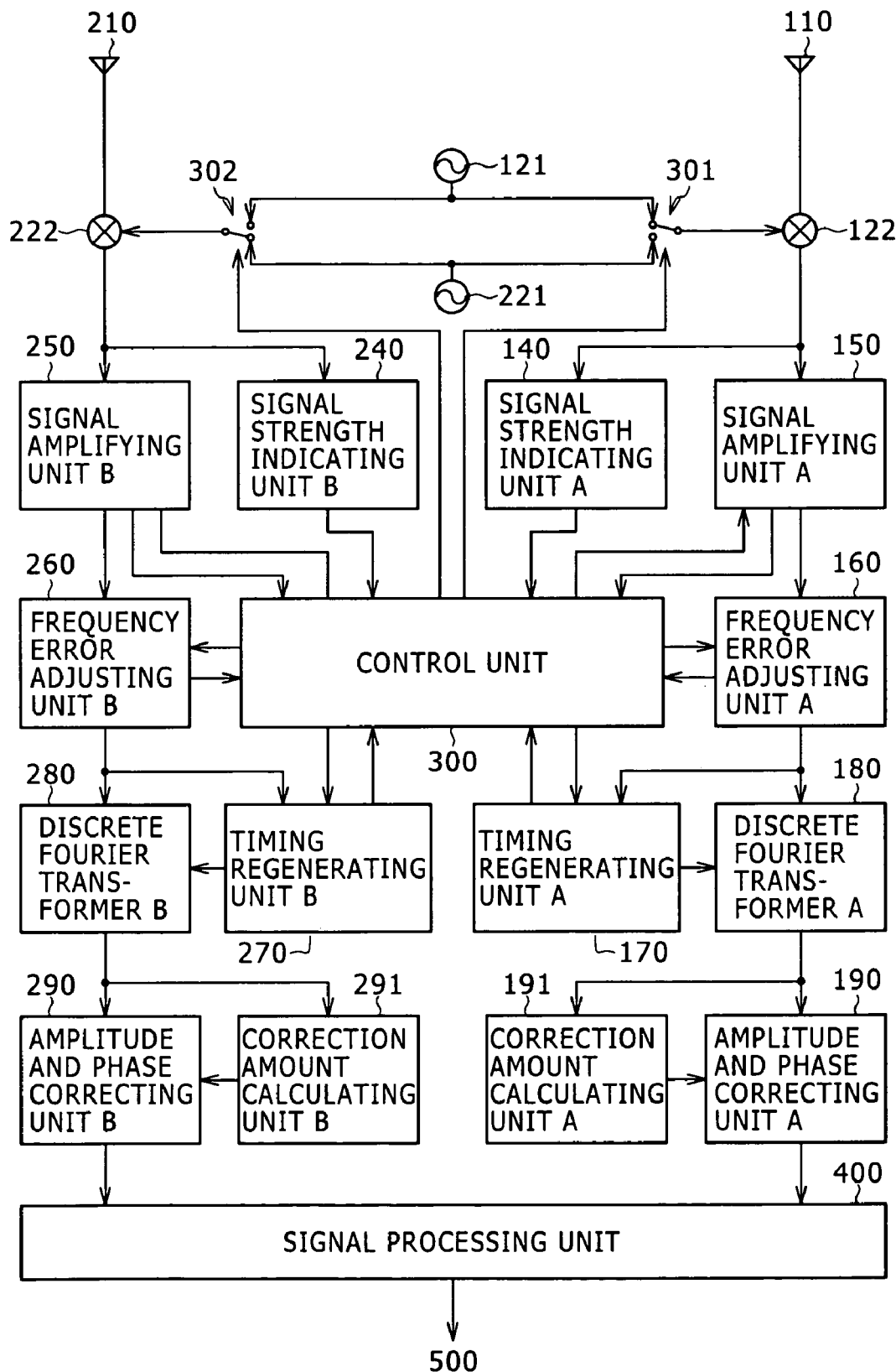
FIG. 2 is a diagram showing an example of internal configuration of receiving blocks of the demodulating device according to the embodiment of the present invention.

FIG. 2 is a diagram showing an example of internal configuration of the receiving blocks of the demodulating device according to the embodiment of the present invention. In this case, supposing the receiving blocks of the two systems, local oscillators A 121 and B 221 and frequency converters A 122 and B 222 are provided as the high-frequency circuits A 120 and B 220, respectively. In addition, switches A 301 and B 302 are provided between the local oscillators A 121 and B 221 and the frequency converters A 122 and B 222, respectively. The switches A 301 and B 302 change connection so as to supply the frequency converters A 122 and B 222 with an oscillation output by the local oscillator A 121 or B 221 under control of the control unit 300.

The frequency converters A 122 and B 222 convert high-frequency signals from the antennas A 110 and B 210 into intermediate-frequency signals, respectively, according to the oscillation output supplied from the local oscillator A 121 or B 221. Specifically, the local oscillator A 121 or B 221 is oscillated at a frequency higher or lower by an intermediate frequency than a frequency at which reception is to be performed, and the frequency converters A 122 and B 222 multiply the oscillation output by the high-frequency signals, whereby intermediate-frequency signals having the intermediate frequency are obtained.

Further, the receiving blocks include signal strength indicating units A 140 and B 240, signal amplifying units A 150 and B 250, frequency error adjusting units A 160 and B 260, timing regenerating units A 170 and B 270, discrete Fourier transformers A 180 and B 280, amplitude and phase correcting units A 190 and B 290, and correction amount calculating units A 191 and B 291 for the amplitude and phase correcting units A 190 and B 290, as the demodulating units A 130 and B 230, respectively.

The signal strength indicating units (RSSI: Received Signal Strength Indicator) A 140 and B 240 are connected to the frequency converters A 122 and B 222, respectively. The signal strength indicating units A 140 and B 240 measure signal strength of the signals from the frequency converters A 122 and B 222, respectively. Results of the measurement are supplied to the control unit 300. When the signal strength has exceeded −52 [dBm], for example, the signal strength indicating units A 140 and B 240 notify the control unit 300 that the signal strength has exceeded −52 [dBm].

The signal amplifying units A 150 and B 250 are connected to the frequency converters A 122 and B 222, respectively. The signal amplifying units A 150 and B 250 amplify the signals from the frequency converters A 122 and B 222 to a predetermined reception level according to an instruction from the control unit 300. The predetermined reception level is within a dynamic range at the time of conversion from an analog signal to a digital signal in the frequency error adjusting units A 160 and B 260, and a value of amplitude from a maximum to a minimum of the received signal reaching 100 [mV p-p (peak-to-peak)], for example, can be used as a reference. In addition, the signal amplifying units A 150 and B 250 output information on a state of operation thereof to the control unit 300. The signal amplifying units A 150 and B 250 can be realized by AGC (Automatic Gain Control) circuits, for example.

The frequency error adjusting units A 160 and B 260 are connected to the signal amplifying units A 150 and B 250, respectively. The frequency error adjusting units A 160 and B 260 shift the signals amplified by the signal amplifying units A 150 and B 250 to a predetermined center frequency according to an instruction from the control unit 300. This frequency error adjustment adjusts an error in carrier frequency between a transmitting device and the receiving device to achieve synchronization. The frequency error adjusting units A 160 and B 260 output information on an amount of the frequency shift to the control unit 300. The frequency error adjusting units A 160 and B 260 can be realized by AFC (Automatic Frequency Control) circuits, for example.

The timing regenerating units A 170 and B 270 are connected to the frequency error adjusting units A 160 and B 260, respectively. The timing regenerating units A 170 and B 270 generate predetermined demodulation timing for the signals resulting from the frequency error adjustment by the frequency error adjusting units A 160 and B 260 according to an instruction from the control unit 300. This demodulation timing is to detect reception of an OFDM signal at the time of demodulation processing of the discrete Fourier transformers A 180 and B 280 and achieve timing synchronization between OFDM symbols and the demodulation processing. The demodulation timing regenerated by the timing regenerating units A 170 and B 270 is referred to as regenerated timing. The timing regenerating units A 170 and B 270 output information on this regenerated timing to the control unit 300.

The discrete Fourier transformers A 180 and B 280 are connected to the frequency error adjusting units A 160 and B 260, respectively. The discrete Fourier transformers A 180 and B 280 demodulate the signals resulting from the frequency error adjustment by the frequency error adjusting units A 160 and B 260 according to the timing information from the timing regenerating units A 170 and B 270, respectively. This demodulation is a multi-carrier demodulation that splits an OFDM signal into subcarrier signals.

The correction amount calculating units A 191 and B 291 are connected to the discrete Fourier transformers A 180 and B 280, respectively. The correction amount calculating units A 191 and B 291 estimate transmission line characteristics of a propagation path from the signals from the discrete Fourier transformers A 180 and B 280, and then calculate amounts of amplitude and phase correction.

The amplitude and phase correcting units A 190 and B 290 are connected to the discrete Fourier transformers A 180 and B 280 and the correction amount calculating units A 191 and B 291, respectively. The amplitude and phase correcting units A 190 and B 290 multiply the signals from the discrete Fourier transformers A 180 and B 280 by the amounts of amplitude and phase correction from the correction amount calculating units A 191 and B 291. The amplitude and phase correcting units A 190 and B 290 output signals thus corrected in amplitude and phase to the signal processing unit 400.

Figure 3:
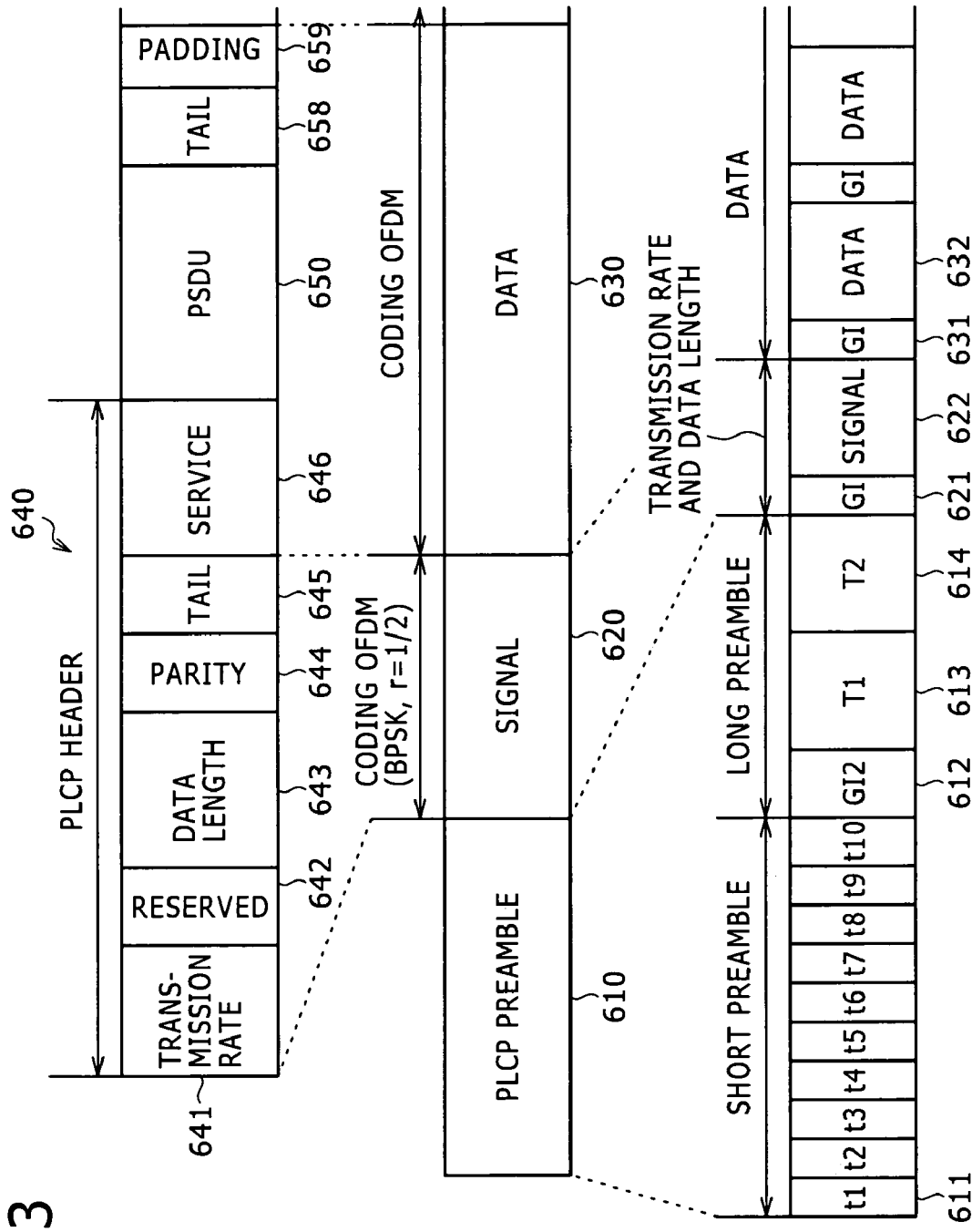
FIG. 3 is a diagram showing a frame structure in an IEEE802.11a standard.

FIG. 3 is a diagram showing a frame structure in an IEEE802.11a standard. The IEEE802.11a standard is set by a working group of an IEEE (Institute of Electrical and Electronics Engineers) 802 standardization committee. Suppose hereinafter that the demodulating device according to the embodiment of the present invention receives frames complying with the IEEE802.11a standard.

A frame complying with the IEEE802.11a standard includes a PLCP (Physical Layer Convergence Protocol) preamble 610, a signal 620, and data 630. The PLCP preamble 610 is a predetermined fixed pattern signal for radio packet signal reception synchronization processing. The signal 620 is an OFDM symbol including a transmission rate and a data length of the data 630. The data 630 is a field including information data proper.

Directing attention to logical fields, the signal 620 includes a four-bit transmission rate 641, one reserved bit 642, a 12-bit data length 643, a one-bit parity 644, and a six-bit tail 645 for terminating convolutional coding of the transmission rate 641, the reserved bit 642, the data length 643, and the parity 644. The transmission rate 641 and the data length 643 both refer to the data 630. The signal 620 itself is transmitted at the most reliable transmission rate of 6 Mbps, that is, a coding rate of ½ using BPSK (Binary Phase Shift Keying) modulation.

The data 630 includes a 16-bit service 646, a variable-length data PSDU (PLCP Service Data Unit) 650, a six-bit tail 658 for terminating convolutional coding of the service 646 and the data PSDU 650, and padding bits 659 for filling remaining bits of an OFDM symbol. The service 646 includes seven bits of "0" for giving an initial state of a scrambler, and nine reserved bits. The fields of the signal 620 and the service 646 form a PLCP header 640.

Directing attention to physical signals within the frame, the PLCP preamble 610 includes a short preamble including 10 short training symbols 611 and a long preamble including two long training symbols 613 and 614. The short preamble is a predetermined fixed pattern signal having a period of 0.8 μs, formed by 12 subcarriers, and is a signal of a total of 8 μs with 10 symbols t1 to t10. The short preamble is used for detection of the radio packet signal by the signal strength indicating units A 140 and B 240, signal amplification by the signal amplifying units A 150 and B 250, coarse adjustment of the carrier frequency error by the frequency error adjusting units A 160 and B 260, and symbol timing detection by the timing regenerating units A 170 and B 270, for example.

On the other hand, the long preamble is a two-symbol repetition signal formed by 52 subcarriers, and is a signal of a total of 8 μs with a 1.6 μs guard interval 612 and two subsequent 3.2 μs long training symbols 613 and 614. This long preamble is used for fine adjustment of the carrier frequency error by the frequency error adjusting units A 160 and B 260, and channel estimation, that is, detection of a reference amplitude and a reference phase of each subcarrier by the correction amount calculating units A 191 and B 291, for example.

The signal 620 has a 0.8 μs guard interval 621 added in front of a 3.2 μs signal 622 proper, and is thus a signal of a total of 4 μs. Also in the data 630, a signal of a total of 4 μs with a 0.8 μs guard interval 631 added in front of 3.2 μs data 632 proper is repeated according to the data length 643.

Figure 4:
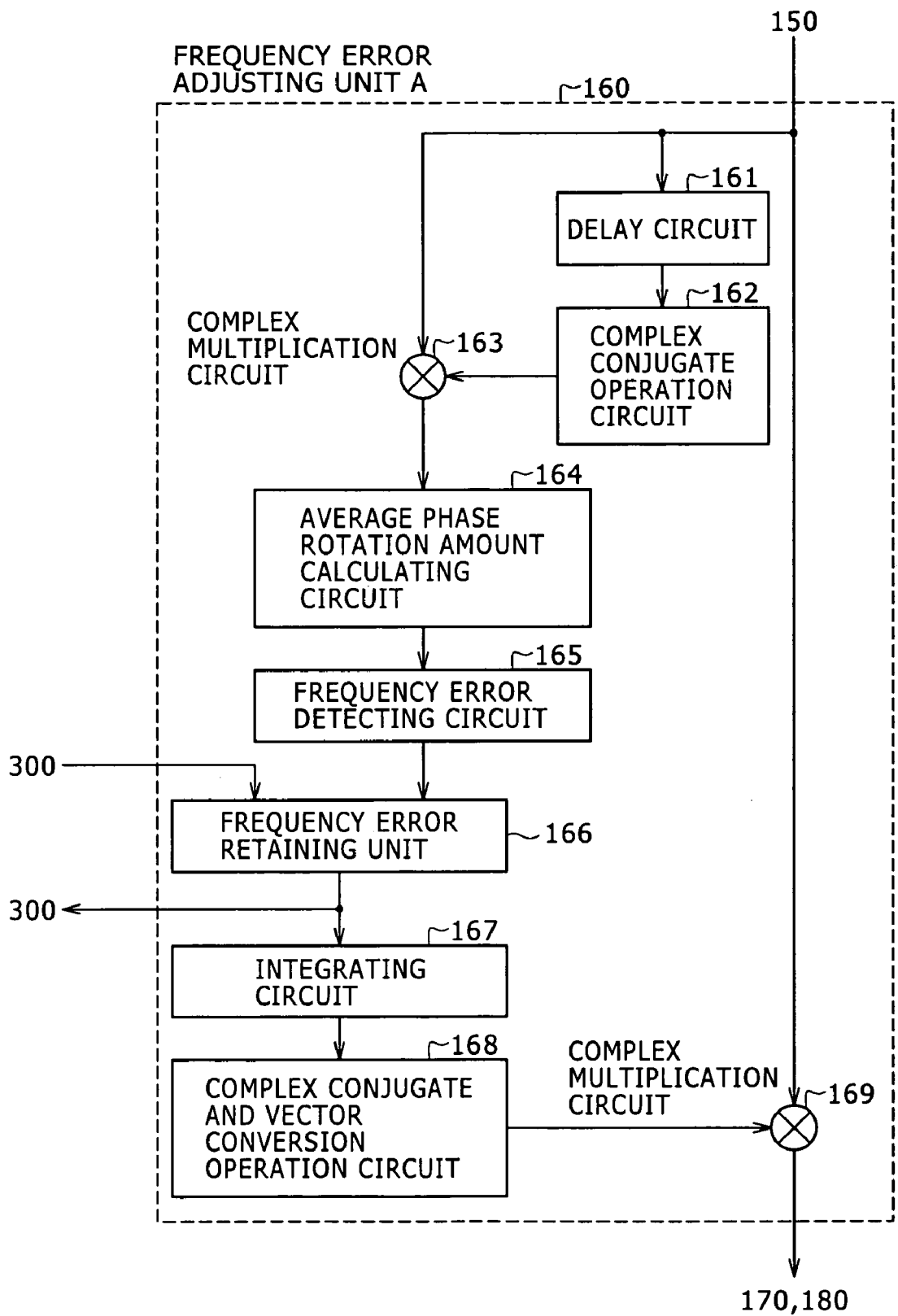
FIG. 4 is a diagram showing an example of configuration of a frequency error adjusting unit A 160 in the embodiment of the present invention.

FIG. 4 is a diagram showing an example of configuration of the frequency error adjusting unit A 160 in the embodiment of the present invention. The frequency error adjusting unit A 160 detects an average amount of phase rotation using a correlation between signals separated from each other by an OFDM symbol repetition interval, and obtains a carrier frequency error. The frequency error adjusting unit A 160 includes a delay circuit 161, a complex conjugate operation circuit 162, a complex multiplication circuit 163, an average phase rotation amount calculating circuit 164, a frequency error detecting circuit 165, a frequency error retaining unit 166, an integrating circuit 167, a complex conjugate and vector conversion operation circuit 168, and a complex multiplication circuit 169.

The delay circuit 161 delays an OFDM signal from the signal amplifying unit A 150 by a time of an OFDM symbol repetition signal interval. The complex conjugate operation circuit 162 performs a complex conjugate operation on an output of the delay circuit 161, and inverts a sign of only a value of an imaginary component of the complex signal, thereby reversing a direction of phase rotation. The complex multiplication circuit 163 performs a complex multiplication of the OFDM signal delayed by the delay circuit 161 and reversed in the direction of phase rotation thereof by the complex conjugate operation circuit 162 by a present OFDM signal from the signal amplifying unit A 150. The complex multiplication circuit 163 thereby calculates an amount of phase rotation.

The average phase rotation amount calculating circuit 164 averages the amount of phase rotation calculated by the complex multiplication circuit 163 over the OFDM symbol repetition interval, and thereby calculates an average amount of phase rotation. The frequency error detecting circuit 165 calculates a carrier frequency error on the basis of the average amount of phase rotation calculated by the average phase rotation amount calculating circuit 164.

The frequency error retaining unit 166 retains the thus calculated carrier frequency error throughout the frame. An input part of the frequency error retaining unit 166 has a selector so that the frequency error retaining unit 166 can also retain a value supplied from the control unit 300. An output of the frequency error retaining unit 166 is output also to the control unit 300.

The integrating circuit 167 integrates the value retained by the frequency error retaining unit 166. The complex conjugate and vector conversion operation circuit 168 performs a complex conjugate and vector conversion operation on the value integrated by the integrating circuit 167. The complex multiplication circuit 169 performs a complex multiplication of an output of the complex conjugate and vector conversion operation circuit 168 by a present OFDM signal, and thereby corrects the carrier frequency error. The signal whose carrier frequency error is thus corrected is output to the timing regenerating unit A 170 and the discrete Fourier transformer A 180.

Incidentally, while an example of configuration of the frequency error adjusting unit A 160 has been described above, the frequency error adjusting unit B 260 can be realized by a similar configuration.

Figure 5:
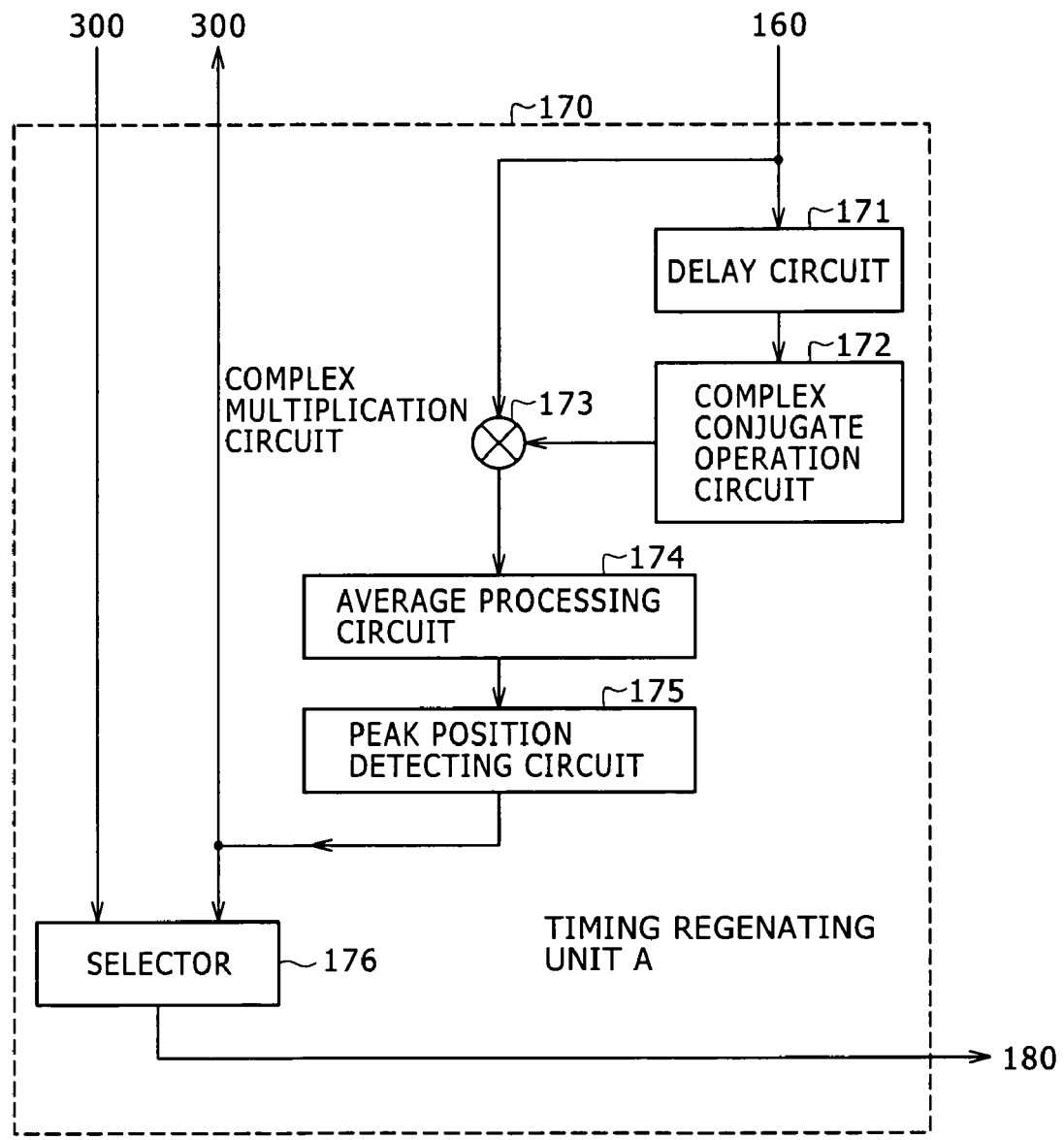
FIG. 5 is a diagram showing an example of configuration of a timing regenerating unit A 170 in the embodiment of the present invention.

FIG. 5 is a diagram showing an example of configuration of the timing regenerating unit A 170 in the embodiment of the present invention. The timing regenerating unit A 170 is an autocorrelation type timing regenerating circuit using an OFDM symbol repetition signal interval. The timing regenerating unit A 170 includes a delay circuit 171, a complex conjugate operation circuit 172, a complex multiplication circuit 173, an average processing circuit 174, a peak position detecting circuit 175, and a selector 176.

The delay circuit 171 delays the signal from the frequency error adjusting unit A 160 by a time of an OFDM symbol repetition signal interval. The complex conjugate operation circuit 172 performs a complex conjugate operation on an output of the delay circuit 171, and inverts a sign of only a value of an imaginary component of the complex signal. The complex multiplication circuit 173 performs a complex multiplication of an output of the complex conjugate operation circuit 172 by the signal from the frequency error adjusting unit A 160. The complex multiplication circuit 173 thereby calculates a correlation between the received signals shifted from each other by the OFDM symbol repetition signal interval.

The average processing circuit 174 averages a correlation value calculated by the complex multiplication circuit 173 over the OFDM symbol repetition interval. The peak position detecting circuit 175 detects that a correlation result of the average processing circuit 174 exceeds a predetermined threshold value, and thereby determines symbol timing. An output of the peak position detecting circuit 175 is supplied to one input of the selector 176 and also supplied to the control unit 300. Another input of the selector 176 is supplied with a value from the control unit 300. That is, the selector 176 supplies either the output of the peak position detecting circuit 175 or the value from the control unit 300 to the discrete Fourier transformer A 180.

Incidentally, while an autocorrelation type timing regenerating circuit has been described above, it is possible to employ a cross-correlation type timing regenerating circuit using a matched filter. In addition, while an example of configuration of the timing regenerating unit A 170 has been described above, the timing regenerating unit B 270 can be realized by a similar configuration.

Figure 6:
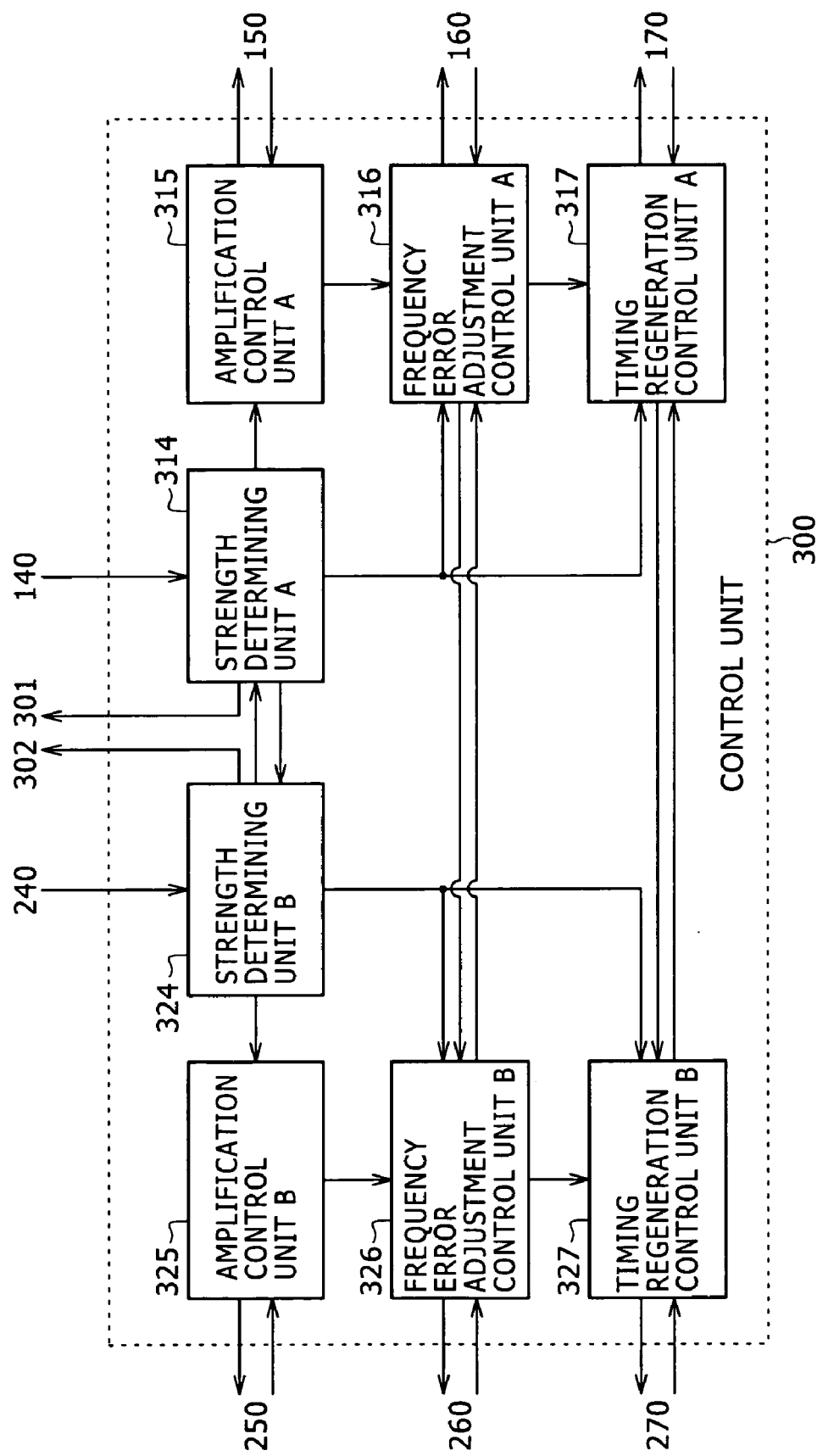
FIG. 6 is a diagram showing an example of configuration of a control unit 300 in the embodiment of the present invention.

FIG. 6 is a diagram showing an example of configuration of the control unit 300 in the embodiment of the present invention. The control unit 300 includes strength determining units A 314 and B 324, amplification control units A 315 and B 325, frequency error adjustment control units A 316 and B 326, and timing regeneration control units A 317 and B 327. That is, this control unit 300 has control blocks of two systems in correspondence with the receiving blocks of the two systems.

The strength determining unit A 314 receives signal strength measured in the signal strength indicating unit A 140. When the signal strength has exceeded a predetermined signal strength, the strength determining unit A 314 notifies the amplification control unit A 315 and the strength determining unit B 324 that the signal strength has exceeded the predetermined signal strength. Similarly, the strength determining unit B 324 receives signal strength measured in the signal strength indicating unit B 240. When the signal strength has exceeded a predetermined signal strength, the strength determining unit B 324 notifies the amplification control unit B 325 and the strength determining unit A 314 that the signal strength has exceeded the predetermined signal strength.

When the strength determining unit A 314 receives a notification that the signal strength in the signal strength indicating unit B 240 has exceeded the predetermined signal strength from the strength determining unit B 324, the strength determining unit A 314 waits for the signal strength in the signal strength indicating unit A 140 to exceed the predetermined signal strength. When the signal strength in the signal strength indicating unit A 140 does not exceed the predetermined signal strength even after passage of a predetermined time, the strength determining unit A 314 determines that reception with the oscillation output of the local oscillator A 121 has failed, and the strength determining unit A 314 controls the switch A 301 so as to change the oscillation output supplied to the frequency converter A 122 from the local oscillator A 121 to the local oscillator B 221. Further, at this time, the strength determining unit A 314 notifies the amplification control unit A 315, the frequency error adjustment control unit A 316, and the timing regeneration control unit A 317 that reception with the oscillation output of the local oscillator A 121 has failed.

When the strength determining unit B 324 receives a notification that the signal strength in the signal strength indicating unit A 140 has exceeded the predetermined signal strength from the strength determining unit A 314, the strength determining unit B 324 waits for the signal strength in the signal strength indicating unit B 240 to exceed the predetermined signal strength. When the signal strength in the signal strength indicating unit B 240 does not exceed the predetermined signal strength even after passage of a predetermined time, the strength determining unit B 324 determines that reception with the oscillation output of the local oscillator B 221 has failed, and the strength determining unit B 324 controls the switch B 302 so as to change the oscillation output supplied to the frequency converter B 222 from the local oscillator B 221 to the local oscillator A 121. Further, at this time, the strength determining unit B 324 notifies the amplification control unit B 325, the frequency error adjustment control unit B 326, and the timing regeneration control unit B 327 that reception with the oscillation output of the local oscillator B 221 has failed.

When the amplification control unit A 315 receives the notification that the signal strength in the signal strength indicating unit A 140 has exceeded the predetermined signal strength or the notification that reception with the oscillation output of the local oscillator A 121 has failed from the strength determining unit A 314, the amplification control unit A 315 starts the signal amplifying unit A 150. When the signal amplifying unit A 150 amplifies the signal to a predetermined reception level, the signal amplifying unit A 150 notifies the amplification control unit A 315 that the signal amplifying unit A 150 has amplified the signal to the predetermined reception level. When the amplification control unit A 315 receives the notification that the signal has been amplified to the predetermined reception level from the signal amplifying unit A 150, the amplification control unit A 315 notifies the frequency error adjustment control unit A 316 that the signal has been amplified to the predetermined reception level.

Similarly, when the amplification control unit B 325 receives the notification that the signal strength in the signal strength indicating unit B 240 has exceeded the predetermined signal strength or the notification that reception with the oscillation output of the local oscillator B 221 has failed from the strength determining unit B 324, the amplification control unit B 325 starts the signal amplifying unit B 250. When the signal amplifying unit B 250 amplifies the signal to a predetermined reception level, the signal amplifying unit B 250 notifies the amplification control unit B 325 that the signal amplifying unit B 250 has amplified the signal to the predetermined reception level. When the amplification control unit B 325 receives the notification that the signal has been amplified to the predetermined reception level from the signal amplifying unit B 250, the amplification control unit B 325 notifies the frequency error adjustment control unit B 326 that the signal has been amplified to the predetermined reception level.

When the frequency error adjustment control unit A 316 receives the notification that the signal has been amplified to the predetermined reception level from the amplification control unit A 315, the frequency error adjustment control unit A 316 starts the frequency error adjusting unit A 160. The frequency error adjusting unit A 160 calculates a frequency error, and then supplies the frequency shift amount to the frequency error adjustment control unit A 316. The frequency error adjustment control unit A 316 supplies the frequency shift amount to the frequency error adjustment control unit B 326.

Similarly, when the frequency error adjustment control unit B 326 receives the notification that the signal has been amplified to the predetermined reception level from the amplification control unit B 325, the frequency error adjustment control unit B 326 starts the frequency error adjusting unit B 260. The frequency error adjusting unit B 260 calculates a frequency error, and then supplies the frequency shift amount to the frequency error adjustment control unit B 326. The frequency error adjustment control unit B 326 supplies the frequency shift amount to the frequency error adjustment control unit A 316.

However, when the strength determining unit A 314 notifies the frequency error adjustment control unit A 316 that reception with the oscillation output of the local oscillator A 121 has failed, the frequency error adjustment control unit A 316 sets the frequency shift amount supplied from the frequency error adjustment control unit B 326 in the frequency error retaining unit 166 of the frequency error adjusting unit A 160. Similarly, when the strength determining unit B 324 notifies the frequency error adjustment control unit B 326 that reception with the oscillation output of the local oscillator B 221 has failed, the frequency error adjustment control unit B 326 sets the frequency shift amount supplied from the frequency error adjustment control unit A 316 in a frequency error retaining unit (corresponding to the frequency error retaining unit 166 in the frequency error adjusting unit A 160 of FIG. 4) of the frequency error adjusting unit B 260.

Next, the timing regeneration control unit A 317 starts the timing regenerating unit A 170. The timing regenerating unit A 170 regenerates demodulation timing, and then supplies the regenerated timing to the timing regeneration control unit A 317. The timing regeneration control unit A 317 supplies the regenerated timing to the timing regeneration control unit B 327.

Similarly, the timing regeneration control unit B 327 starts the timing regenerating unit B 270. The timing regenerating unit B 270 regenerates demodulation timing, and then supplies the regenerated timing to the timing regeneration control unit B 327. The timing regeneration control unit B 327 supplies the regenerated timing to the timing regeneration control unit A 317.

However, when the strength determining unit A 314 notifies the timing regeneration control unit A 317 that reception with the oscillation output of the local oscillator A 121 has failed, the timing regeneration control unit A 317 makes the selector 176 of the timing regenerating unit A 170 select the regenerated timing supplied from the timing regeneration control unit B 327. Similarly, when the strength determining unit B 324 notifies the timing regeneration control unit B 327 that reception with the oscillation output of the local oscillator B 221 has failed, the timing regeneration control unit B 327 makes a selector (corresponding to the selector 176 in the timing regenerating unit A 170 of FIG. 5) of the timing regenerating unit B 270 select the regenerated timing supplied from the timing regeneration control unit A 317.

FIG. 7 is a diagram showing an example of operation timing in the embodiment of the present invention. Suppose in this case that initially, the frequency converter A 122 is supplied with the oscillation output of the local oscillator A 121 and the frequency converter B 222 is supplied with the oscillation output of the local oscillator B 221. Suppose that the signal strength indicating unit A 140 detects a predetermined signal strength, and that thereafter the signal strength indicating unit B 240 does not detect a predetermined signal strength within a predetermined time.

From a start of a short preamble 615, the signal amplifying unit A 150 amplifies the signal, and the frequency error adjusting unit A 160 adjusts a carrier frequency error. In the meantime, the signal amplifying unit B 250 initially does not perform signal amplification. Since the signal strength indicating unit B 240 does not detect a predetermined signal strength within a predetermined time, the switch 302 is changed so as to supply the oscillation output of the local oscillator A 121 to the frequency converter B 222. Thereafter the signal amplifying unit B 250 also performs signal amplification.

Since most of a period of the short preamble 615 has already passed, it is difficult for the frequency error adjusting unit B 260 to calculate a carrier frequency error on its own. Therefore a carrier frequency error calculated by the frequency error adjusting unit A 160 is supplied to the frequency error adjusting unit B 260. Specifically, the carrier frequency error is set in the frequency error retaining unit within the frequency error adjusting unit B 260, the frequency error retaining unit within the frequency error adjusting unit B 260 corresponding to the frequency error retaining unit 166 within the frequency error adjusting unit A 160 of FIG. 4. The frequency error adjusting unit B 260 can thereby adjust the carrier frequency error.

In timing in which the short preamble 615 is changed to a long preamble 616, the timing regenerating unit A 170 outputs regenerated timing. This regenerated timing is used for a subsequent Fourier transform in the discrete Fourier transformer A 180. On the other hand, as in the case of the frequency error adjusting unit B 260, the timing regenerating unit B 270 cannot regenerate timing on its own. Therefore the timing regenerating unit B 270 uses the regenerated timing output by the timing regenerating unit A 170 and outputs the regenerated timing to the discrete Fourier transformer B 280.

Incidentally, while the above description has been made of a case where the signal strength indicating unit B 240 does not detect a predetermined signal strength within a predetermined time, when the signal strength indicating unit A 140 does not detect a predetermined signal strength within a predetermined time, similar operation is performed with only mutual relations being reversed.

Figure 8A:
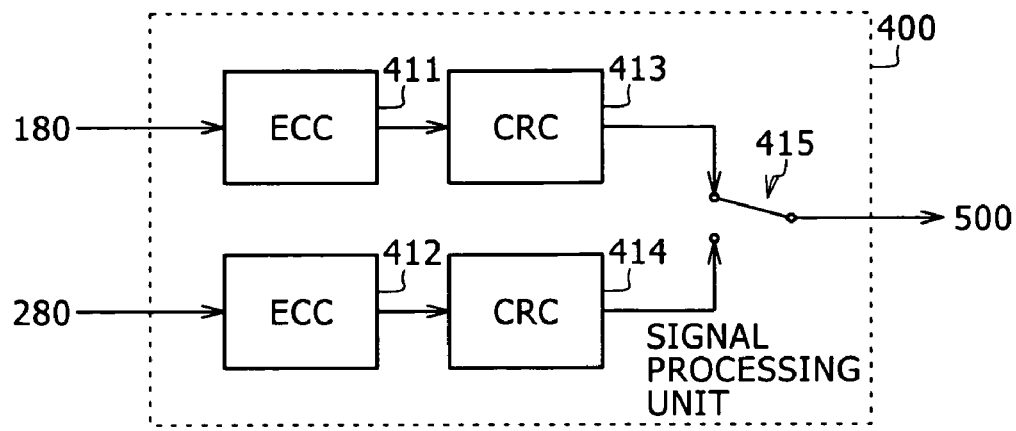
FIGS. 8A, 8B, and 8C are diagrams showing examples of configuration of a signal processing unit 400 in the embodiment of the present invention.
Figure 8B:
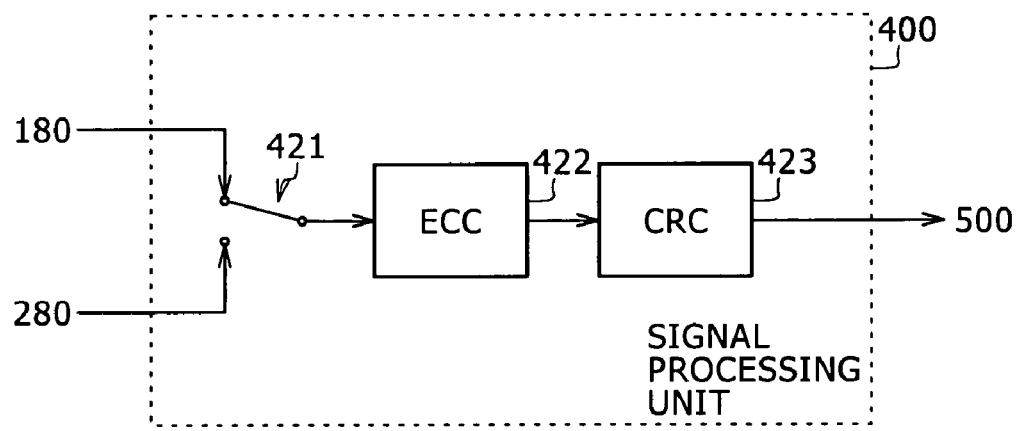
Figure 8C:
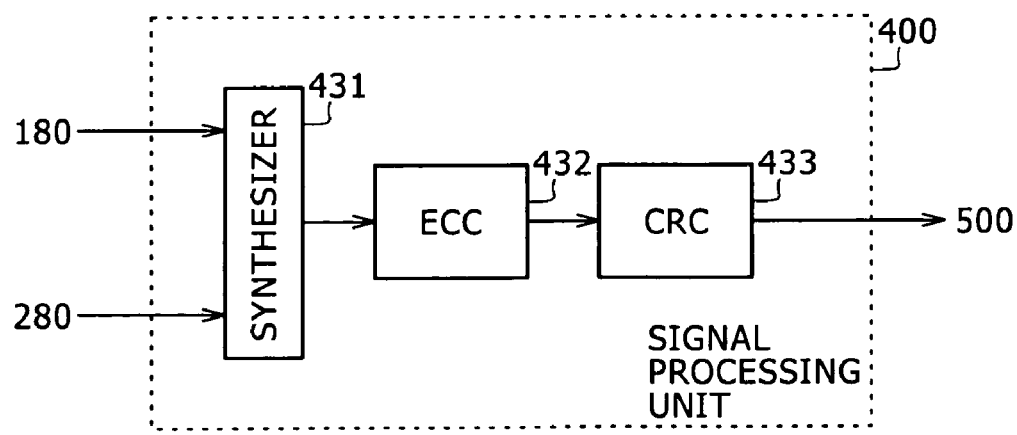

FIGS. 8A, 8B, and 8C are diagrams showing examples of configuration of the signal processing unit 400 in the embodiment of the present invention. This signal processing unit 400 receives signals of the two systems from the amplitude and phase correcting units A 190 and B 290, performs signal processing, and then outputs a signal of one system to the communication control unit 500.

In an example of configuration in FIG. 8A, ECCs (Error Correcting Code) 411 and 412 separately subject the signals of the two systems to error correction processing for detecting and correcting an error in data, and CRCs (Cyclic Redundancy Check) 413 and 414 perform a cyclic redundancy check for detecting a burst error. One of the signals in which signal no error is detected as a result of the error correction processing and the cyclic redundancy check is selected by a switch 415.

In an example of configuration in FIG. 8B, one of the signals of the two systems which signal has a higher received signal strength in subcarrier units is selected by a switch 421 to reduce the signals of the two systems to the signal of one system. Then, the obtained signal of one system is subjected to error correction processing by an ECC 422 and a cyclic redundancy check by a CRC 423.

In an example of configuration in FIG. 8C, the signals of the two systems are synthesized in subcarrier units by a synthesizer 431 into a signal of one system. Then, the obtained signal of one system is subjected to error correction processing by an ECC 432 and a cyclic redundancy check by a CRC 433.

As a result of such signal processing by the signal processing unit 400, the signals of the two systems from the amplitude and phase correcting units A 190 and B 290 are synthesized into one system. Thus, when the frequency converters A 122 and B 222 use the oscillation outputs different from each other of the local oscillators A 121 and B 221, effects of frequency diversity can be obtained. In addition, when the frequency converters A 122 and B 222 share the oscillation output of either the local oscillator A 121 or B 221, effects of space diversity can be obtained.

It is to be noted that while the configuration for synthesis or selection in the signal processing unit 400 has been described with reference to FIG. 8A, 8B, or 8C supposing effects of frequency diversity, the configuration is a mere example. As another example, supposing that one piece of data is divided into a first half part and a second half part, for example, and that the first half part and the second half part are transmitted by transmission paths different from each other, the original data can be restored by combining the first half part and the second half part with each other from the signals of the two systems from the amplitude and phase correcting units A 190 and B 290. Such combination of the first half part and the second half part may be performed in the signal processing unit 400 or the communication control unit 500 in a subsequent stage.

Further, the signals of the two systems are not limited to the relation of the first half part and the second half part, and may be pieces of data independent of each other. In this case, these pieces of data are supplied as pieces of data independent of each other from the signal processing unit 400 to the communication control unit 500, and the communication control unit 500 handles the pieces of data as pieces of data independent of each other.

Operation procedures of the demodulating device according to the embodiment of the present invention will next be described with reference to drawings.

Figure 9:
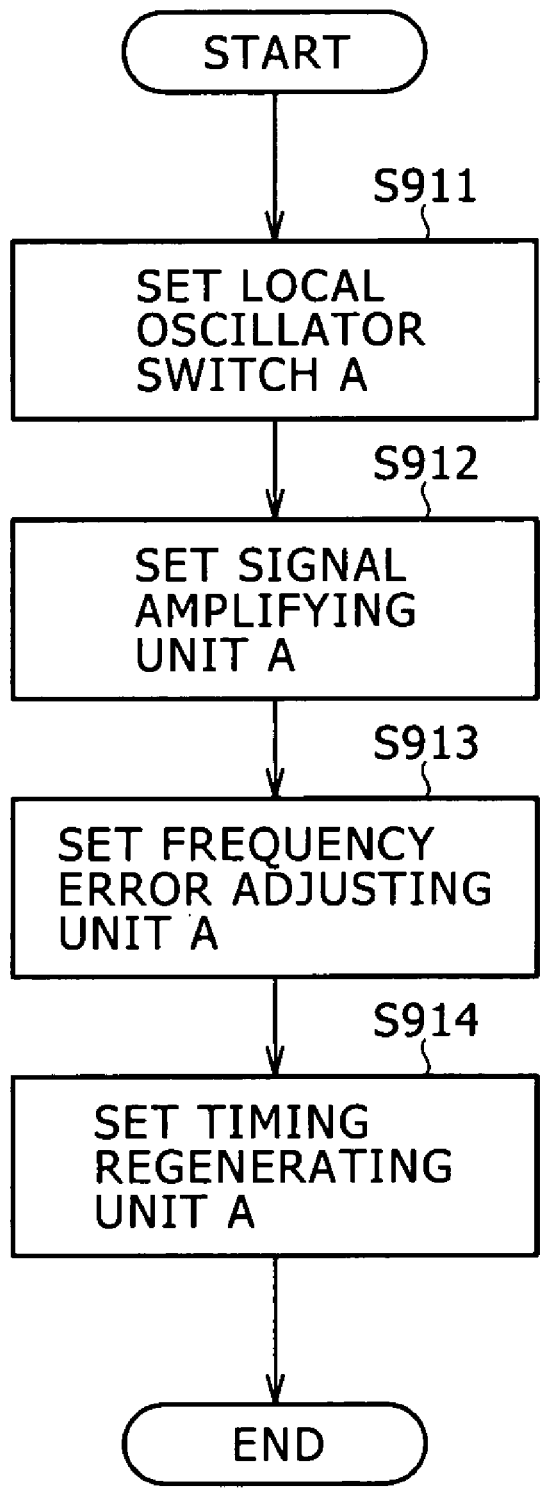
FIG. 9 is a flowchart showing an example of an initialization procedure of the control unit 300 in the embodiment of the present invention.

FIG. 9 is a flowchart showing an example of an initialization procedure of the control unit 300 in the embodiment of the present invention. First, the strength determining unit A 314 sets the switch A 301 in an initial state such that the oscillation output of the local oscillator A 121, for example, is supplied to the frequency converter A 122 (step S911).

Then, the amplification control unit A 315 instructs the signal amplifying unit A 150 to stand by without performing a pull-in process for signal amplification (step S912). Also, the frequency error adjustment control unit A 316 instructs the frequency error adjusting unit A 160 to stand by without performing a pull-in process for frequency error adjustment (step S913). Further, the timing regeneration control unit A 317 instructs the timing regenerating unit A 170 to stand by without performing a pull-in process for regenerated timing generation (step S914)

Incidentally, while the above description has been made of the initialization procedure for one system formed by the strength determining unit A 314, the amplification control unit A 315, the frequency error adjustment control unit A 316, and the timing regeneration control unit A 317, the same description applies to the other system, and a similar initialization procedure is performed by the strength determining unit B 324, the amplification control unit B 325, the frequency error adjustment control unit B 326, and the timing regeneration control unit B 327.

Figure 10:
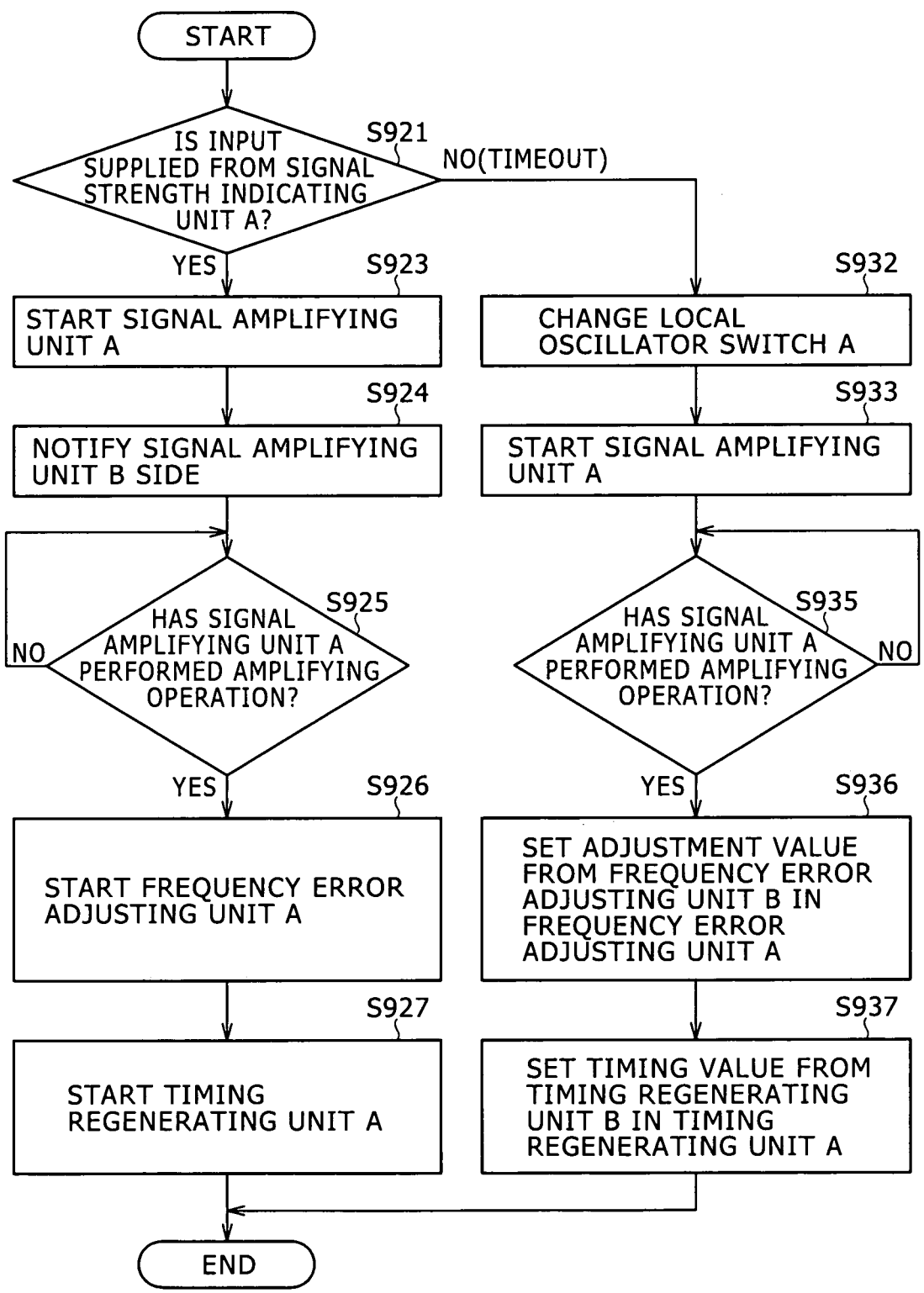
FIG. 10 is a flowchart showing an example of a control procedure of the control unit 300 in the embodiment of the present invention.

FIG. 10 is a flowchart showing an example of a control procedure of the control unit 300 in the embodiment of the present invention. When the signal strength indicating unit A 140 measures a predetermined signal strength (step S921), the strength determining unit A 314 notifies the amplification control unit A 315 that the signal strength in the signal strength indicating unit A 140 has exceeded the predetermined signal strength. Thus the amplification control unit A 315 starts the signal amplifying unit A 150 (step S923). The strength determining unit A 314 also notifies the strength determining unit B 324 on the signal amplifying unit B 250 side that the signal strength in the signal strength indicating unit A 140 has exceeded the predetermined signal strength (step S924).

Then, when the amplification control unit A 315 receives a notification that amplification to a predetermined reception level has been performed from the signal amplifying unit A 150 (step S925), the frequency error adjustment control unit A 316 starts the frequency error adjusting unit A 160 to perform frequency error adjustment (step S926). Also, the timing regeneration control unit A 317 starts the timing regenerating unit A 170 to perform regenerated timing generation (step S927).

The above-described procedure (steps S923 to S927) is also applied to a case where the signal strength indicating unit B 240 first measures the predetermined signal strength, and thereafter the signal strength indicating unit A 140 measures the predetermined signal strength within a predetermined time. However, when the signal strength indicating unit B 240 first measures the predetermined signal strength, and thereafter the signal strength indicating unit A 140 does not measure the predetermined signal strength within a predetermined time, a timeout occurs, and the following process is performed (step S921).

The strength determining unit A 314 controls the switch A 301 so as to change the oscillation output of the local oscillator to the frequency converter A 122 and supply the oscillation output of the local oscillator B 221, for example, to the frequency converter A 122 (step S932). Then, the strength determining unit A 314 notifies the amplification control unit A 315 that reception with the oscillation output of the local oscillator A 121 has failed. Thus the amplification control unit A 315 starts the signal amplifying unit A 150 (step S933).

Then, when the amplification control unit A 315 receives a notification that amplification to a predetermined reception level has been performed from the signal amplifying unit A 150 (step S935), the frequency error adjustment control unit A 316 sets a frequency error supplied from the frequency error adjusting unit B 260 in the frequency error retaining unit 166 of the frequency error adjusting unit A 160 (step S936). Also, the timing regeneration control unit A 317 sets regenerated timing supplied from the timing regenerating unit B 270 in the timing regenerating unit A 170 (step S937).

Incidentally, while the above description has been made of the control procedure for one system formed by the strength determining unit A 314, the amplification control unit A 315, the frequency error adjustment control unit A 316, and the timing regeneration control unit A 317, the same description applies to the other system, and a similar control procedure is performed by the strength determining unit B 324, the amplification control unit B 325, the frequency error adjustment control unit B 326, and the timing regeneration control unit B 327. Then, in the respective systems, the discrete Fourier transformers A 180 and B 280 perform a discrete Fourier transform and the amplitude and phase correcting units A 190 and B 290 perform amplitude and phase correction. Thereafter the signal processing unit 400 performs signal processing.

Thus, according to the embodiment of the present invention, when a predetermined signal strength is not measured in the first system within a predetermined time at the time of demodulation by a frequency diversity system, the strength determining unit A 314 or B 324 performs control such that a reception frequency in the second system is shared with the first system. Then, a frequency error generated in the second system is supplied to the first system by the frequency error adjustment control units A 316 and B 326. Regenerated timing generated in the second system is supplied to the first system by the timing regeneration control units A 317 and B 327. Thereby a changeover can be made to perform demodulation by a space diversity system. It is thus possible to increase efficiency of use of the first system.

It is to be noted that the embodiment of the present invention represents one example for embodying the present invention. While the embodiment of the present invention has correspondences with specific inventive items in claims as illustrated in the following, the present invention is not limited to this, and is susceptible of various modifications without departing from the spirit of the present invention.

In claim 1, the first high-frequency receiving means and the second high-frequency receiving means correspond to the high-frequency circuits A 120 and B 220, for example. The first signal strength detecting means and the second signal strength detecting means correspond to the signal strength indicating units A 140 and B 240, for example. The strength determining means corresponds to the strength determining units A 314 and B 324, for example.

In claim 2, the first frequency error adjusting means and the second frequency error adjusting means correspond to the frequency error adjusting units A 160 and B 260, for example.

The frequency error adjustment control means corresponds to the frequency error adjustment control units A 316 and B 326, for example.

In claim 3 or 4, the first timing regenerating means and the second timing regenerating means correspond to the timing regenerating units A 170 and B 270, for example. The timing regeneration control means corresponds to the timing regeneration control units A 317 and B 327, for example.

In claim 5, the first high-frequency receiving means and the second high-frequency receiving means correspond to the high-frequency circuits A 120 and B 220, for example. The first signal strength detecting means and the second signal strength detecting means correspond to the signal strength indicating units A 140 and B 240, for example. The strength determining means corresponds to the strength determining units A 314 and B 324, for example. The first frequency error adjusting means and the second frequency error adjusting means correspond to the frequency error adjusting units A 160 and B 260, for example. The frequency error adjustment control means corresponds to the frequency error adjustment control units A 316 and B 326, for example. The first demodulating means and the second demodulating means correspond to the discrete Fourier transformers A 180 and B 280, for example. The first timing regenerating means and the second timing regenerating means correspond to the timing regenerating units A 170 and B 270, for example. The timing regeneration control means corresponds to the timing regeneration control units A 317 and B 327, for example. The signal processing means corresponds to the signal processing unit 400, for example.

In claim 6, the error detecting means corresponds to the ECCs 411 and 412 and the CRCs 413 and 414. The selecting means corresponds to the switch 415, for example.

In claim 7, the selecting means corresponds to the switch 421, for example.

In claim 8, the synthesizing means corresponds to the synthesizer 431, for example.

In claim 9 or 10, the first high-frequency receiving means and the second high-frequency receiving means correspond to the high-frequency circuits A 120 and B 220, for example. The first frequency error adjusting means and the second frequency error adjusting means correspond to the frequency error adjusting units A 160 and B 260, for example. The first timing regenerating means and the second timing regenerating means correspond to the timing regenerating units A 170 and B 270, for example. The step of making the first high-frequency receiving means receive a high-frequency signal of a first frequency and making the second high-frequency receiving means receive a high-frequency signal of a second frequency corresponds to the step S911, for example. The step of detecting respective strengths of the signals received by the first high-frequency receiving means and the second high-frequency receiving means corresponds to the step S921, for example. The step of performing control so as to make the second high-frequency receiving means receive the high-frequency signal of the first frequency when a predetermined signal strength is not detected from the second high-frequency receiving means within a predetermined time after a predetermined signal strength is detected from the first high-frequency receiving means corresponds to step S932, for example. The step of supplying a carrier frequency error generated by the first frequency error adjusting means to the second frequency error adjusting means when the predetermined signal strength is not detected from the second high-frequency receiving means within the predetermined time after the predetermined signal strength is detected from the first high-frequency receiving means corresponds to step S936, for example. The step of supplying timing regenerated by the first timing regenerating means to the second timing regenerating means when the predetermined signal strength is not detected from the second high-frequency receiving means within the predetermined time after the predetermined signal strength is detected from the first high-frequency receiving means corresponds to step S937, for example.

It is to be noted that the process steps described in the embodiment of the present invention may be construed as a method having the series of steps, or may be construed as a program for making a computer perform the series of steps or a recording medium storing the program.

As an example of application of the present invention, the present invention is applicable to cases where a demodulating device having a plurality of receiving blocks makes effective use of the receiving blocks, for example.

It should be understood by those skilled in the art that various modifications, combinations, sub-combinations and alterations may occur depending on design requirements and other factors insofar as they are within the scope of the appended claims r the equivalents thereof.

What is claimed is:

1. A demodulating device comprising:
    first high-frequency receiving means and second high-frequency receiving means for receiving a high-frequency signal of one of a first frequency and a second frequency;
    first signal strength detecting means and second signal strength detecting means for detecting strengths of signals received by said first high-frequency receiving means and said second high-frequency receiving means, respectively; and
    strength determining means for performing control so as to make said second high-frequency receiving means receive a high-frequency signal of said first frequency when said first high-frequency receiving means is made to receive the high-frequency signal of said first frequency and said second high-frequency receiving means is made to receive a high-frequency signal of said second frequency and when said second signal strength detecting means does not detect a predetermined signal strength within a predetermined time after said first signal strength detecting means detects a predetermined signal strength.

2. The demodulating device as claimed in claim 1, further comprising:
    first frequency error adjusting means and second frequency error adjusting means for generating and adjusting carrier frequency errors of the signals received by said first high-frequency receiving means and said second high-frequency receiving means; and
    frequency error adjustment control means for supplying the carrier frequency error generated by said first frequency error adjusting means to said second frequency error adjusting means when said second signal strength detecting means does not detect the predetermined signal strength within the predetermined time after said first signal strength detecting means detects the predetermined signal strength.

3. The demodulating device as claimed in claim 2, further comprising:
    first timing regenerating means and second timing regenerating means for regenerating timing of a demodulation process for respective output signals of said first frequency error adjusting means and said second frequency error adjusting means; and
    timing regeneration control means for supplying the timing regenerated by said first timing regenerating means to said second timing regenerating means when said second signal strength detecting means does not detect the predetermined signal strength within the predetermined time after said first signal strength detecting means detects the predetermined signal strength.

4. The demodulating device as claimed in claim 1, further comprising:

first timing regenerating means and second timing regenerating means for regenerating timing of a demodulation process for the signals received by said first high-frequency receiving means and said second high-frequency receiving means; and timing regeneration control means for supplying the timing regenerated by said first timing regenerating means to said second timing regenerating means when said second signal strength detecting means does not detect the predetermined signal strength within the predetermined time after said first signal strength detecting means detects the predetermined signal strength.

5. A demodulating device comprising:

first high-frequency receiving means and second high-frequency receiving means for receiving a high-frequency signal of one of a first frequency and a second frequency;

first signal strength detecting means and second signal strength detecting means for detecting strengths of signals received by said first high-frequency receiving means and said second high-frequency receiving means, respectively;

strength determining means for performing control so as to make said second high-frequency receiving means receive a high-frequency signal of said first frequency when said first high-frequency receiving means is made to receive the high-frequency signal of said first frequency and said second high-frequency receiving means is made to receive a high-frequency signal of said second frequency and when said second signal strength detecting means does not detect a predetermined signal strength within a predetermined time after said first signal strength detecting means detects a predetermined signal strength;

first frequency error adjusting means and second frequency error adjusting means for generating and adjusting carrier frequency errors of the signals received by said first high-frequency receiving means and said second high-frequency receiving means, respectively;

frequency error adjustment control means for supplying the carrier frequency error generated by said first frequency error adjusting means to said second frequency error adjusting means when said second signal strength detecting means does not detect the predetermined signal strength within the predetermined time after said first signal strength detecting means detects the predetermined signal strength;

first demodulating means and second demodulating means for demodulating respective output signals of said first frequency error adjusting means and said second frequency error adjusting means;

first timing regenerating means and second timing regenerating means for regenerating timing of a demodulation process by said first demodulating means and said second demodulating means for the respective output signals of said first frequency error adjusting means and said second frequency error adjusting means;

timing regeneration control means for supplying the timing regenerated by said first timing regenerating means to said second timing regenerating means when said second signal strength detecting means does not detect the predetermined signal strength within the predetermined time after said first signal strength detecting means detects the predetermined signal strength; and signal processing means for performing signal processing on output signals of said first demodulating means and said second demodulating means.

6. The demodulating device as claimed in claim 5, wherein said signal processing means comprises error detecting means for detecting errors in the respective output signals of said first demodulating means and said second demodulating means, and selecting means for selecting an output signal whose error is not detected by said error detecting means from the output signals of said first demodulating means and said second demodulating means.

7. The demodulating device as claimed in claim 5, wherein said signal processing means comprises selecting means for selecting an output signal having a higher strength of the strengths detected by said first signal strength detecting means and said second signal strength detecting means from the output signals of said first demodulating means and said second demodulating means.

8. The demodulating device as claimed in claim 5, wherein said signal processing means comprises synthesizing means for synthesizing the output signals of said first demodulating means and said second demodulating means in subcarrier units.

9. A demodulating method for a demodulating device, said demodulating device comprising first high-frequency receiving means and second high-frequency receiving means for receiving a high-frequency signal of one of a first frequency and a second frequency, first frequency error adjusting means and second frequency error adjusting means for generating and adjusting carrier frequency errors of the signals received by said first high-frequency receiving means and said second high-frequency receiving means, respectively, and first timing regenerating means and second timing regenerating means for regenerating timing of a demodulation process for respective output signals of said first frequency error adjusting means and said second frequency error adjusting means, said demodulating method comprising the steps of:

making said first high-frequency receiving means receive a high-frequency signal of said first frequency and making said second high-frequency receiving means receive a high-frequency signal of said second frequency;

detecting strengths of the signals received by said first high-frequency receiving means and said second high-frequency receiving means, respectively;

performing control so as to make said second high-frequency receiving means receive the high-frequency signal of said first frequency when a predetermined signal strength is not detected from said second high-frequency receiving means within a predetermined time after a predetermined signal strength is detected from said first high-frequency receiving means;

supplying the carrier frequency error generated by said first frequency error adjusting means to said second frequency error adjusting means when the predetermined signal strength is not detected from said second high-frequency receiving means within the predetermined time after the predetermined signal strength is detected from said first high-frequency receiving means; and supplying the timing regenerated by said first timing regenerating means to said second timing regenerating means when the predetermined signal strength is not detected from said second high-frequency receiving means within the predetermined time after the predetermined signal strength is detected from said first high-frequency receiving means.

10. A computer-readable medium storing a computer program for a demodulating device, said demodulating device comprising first high-frequency receiving means and second high-frequency receiving means for receiving a high-frequency signal of one of a first frequency and a second frequency, first frequency error adjusting means and second frequency error adjusting means for generating and adjusting carrier frequency errors of the signals received by said first high-frequency receiving means and said second high-frequency receiving means, respectively, and first timing regenerating means and second timing regenerating means for regenerating timing of a demodulation process for respective output signals of said first frequency error adjusting means and said second frequency error adjusting means, said program being operable to implement a method comprising the steps of:

making said first high-frequency receiving means receive a high-frequency signal of said first frequency and making said second high-frequency receiving means receive a high-frequency signal of said second frequency;

detecting strengths of the signals received by said first high-frequency receiving means and said second high-frequency receiving means, respectively;

performing control so as to make said second high-frequency receiving means receive the high-frequency signal of said first frequency when a predetermined signal strength is not detected from said second high-frequency receiving means within a predetermined time after a predetermined signal strength is detected from said first high-frequency receiving means;

supplying the carrier frequency error generated by said first frequency error adjusting means to said second frequency error adjusting means when the predetermined signal strength is not detected from said second high-frequency receiving means within the predetermined time after the predetermined signal strength is detected from said first high-frequency receiving means; and supplying the timing regenerated by said first timing regenerating means to said second timing regenerating means when the predetermined signal strength is not detected from said second high-frequency receiving means within the predetermined time after the predetermined signal strength is detected from said first high-frequency receiving means.

11. A demodulating device comprising:

a first high-frequency receiver and a second high-frequency receiver for receiving a high-frequency signal of one of a first frequency and a second frequency;

a first signal strength detector and a second signal strength detector for detecting strengths of signals received by said first high-frequency receiver and said second high-frequency receiver, respectively; and a strength determining section for performing control so as to make said second high-frequency receiver receive a high-frequency signal of said first frequency when said first high-frequency receiver is made to receive the high-frequency signal of said first frequency and said second high-frequency receiver is made to receive a high-frequency signal of said second frequency and when said second signal strength detector does not detect a predetermined signal strength within a predetermined time after said first signal strength detector detects a predetermined signal strength.

12. A demodulating device comprising:

a first, high-frequency receiver and a second high-frequency receiver for receiving a high-frequency signal of one of a first frequency and a second frequency;

a first signal strength detector and a second signal strength detector for detecting strengths of signals received by said first high-frequency receiver and said second high-frequency receiver, respectively;

a strength determining section for performing control so as to make said second high-frequency receiver receive a high-frequency signal of said first frequency when said first high-frequency receiver is made to receive the high-frequency signal of said first frequency and said second high-frequency receiver is made to receive a high-frequency signal of said second frequency and when said second signal strength detector does not detect a predetermined signal strength within a predetermined time after said first signal strength detector detects a predetermined signal strength;

a first frequency error adjuster and a second frequency error adjuster for generating and adjusting carrier frequency errors of the signals received by said first high-frequency receiver and said second high-frequency receiver, respectively;

a frequency error adjustment controller for supplying the carrier frequency error generated by said first frequency error adjuster to said second frequency error adjuster when said second signal strength detector does not detect the predetermined signal strength within the predetermined time after said first signal strength detector detects the predetermined signal strength;

a first demodulator and a second demodulator for demodulating respective output signals of said first frequency error adjuster and said second frequency error adjuster;

a first timing regenerator and a second timing regenerator for regenerating timing of a demodulation process by said first demodulator and said second demodulator for the respective output signals of said first frequency error adjuster and said second frequency error adjuster;

a timing regeneration controller for supplying the timing regenerated by said first timing regenerator to said second timing regenerator when said second signal strength detector does not detect the predetermined signal strength within the predetermined time after said first signal strength detector detects the predetermined signal strength; and a signal processor for performing signal processing on output signals of said first demodulator and said second demodulator.

* * * * *